(12) United States Patent
Myers (10) Patent No.: US 6,771,710 B1
(45) Date of Patent: Aug. 3, 2004

(54) PARTIAL FREQUENCY OFFSET DIGITAL UPCONVERSION

(75) Inventor: Michael H. Myers, Poway, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 826 days.

(21) Appl. No.: 09/690,312

(22) Filed: Oct. 17, 2000

(51) Int. Cl.⁷ .............................................. H04L 27/36
(52) U.S. Cl. ...................... 375/298; 375/302; 375/308; 455/118
(58) Field of Search .................. 375/295, 298, 375/302, 303, 308; 455/118, 324, 323; 332/100, 103

(56) References Cited

U.S. PATENT DOCUMENTS

| | | | | |
|---|---|---|---|---|
| 4,583,048 A | * | 4/1986 | Gumacos et al. | 329/302 |
| 5,574,671 A | * | 11/1996 | Young et al. | 708/204 |
| 5,898,338 A | * | 4/1999 | Proctor et al. | 330/149 |
| 6,549,544 B1 | * | 4/2003 | Kroeger et al. | 370/482 |

* cited by examiner

*Primary Examiner*—Don N. Vo
(74) *Attorney, Agent, or Firm*—Tarolli, Sundheim, Covell & Tummino L.L.P.

(57) ABSTRACT

The present invention is an apparatus for and a method of upconverting a (complex) phase and possible amplitude modulated baseband signal for radio transmission, also known in the industry as Quadrature Amplitude Modulation (QAM). The two components of the baseband signal consisting of an in-phase component I and a quadrature component Q, are to be upconverted to a desired real signal at a frequency $f_d$hZ, (normally called the IF or intermediate frequency signal). A subsequent conversion to a higher RF carrier frequency may occur after this process. This invention utilizes to a high degree a single channel for the upconversion process before the signal has been fully upconverted to the desired (IF) frequency $f_d$ in order to reduce the processing complexity in a digital upconverter. In accordance with the present invention, at least one of the two (complex) components is upconverted to a frequency $f_2$ hZ (which is small compared to the IF frequency $f_d$ and falls within the bandpass of the upconverter process) and is then added in a non-overlapping (in frequency) manner to the other component with the result that all modulation information is conveyed by a single (real) signal. The resulting real signal may consist of either 1) the sum of the baseband Q component added to the I component upconverted to $f_2$ or 2) the I and Q baseband information modulated on a very low carrier frequency of $f_2$ hZ such that the partially upconverted signal spectrum lies within the digital upconversion bandpass region. The second upconversion to the desired (IF) frequency $f_d$ is made on the partially upconverted real signal. Undesired sidebands are removed by an IF filter.

The appartus of the present invention can be implemented on a gate array, such as a field programmable gate array, which will result in a realization with a reduced number of configurable logic blocks (CLBs) compared to upsampling both I and Q to a high sample rate (50 Mhz for example) followed by modulation of the IF carrier. Thus this invention facilitates the implementation of a digital upconverter using logic gate arrays.

29 Claims, 12 Drawing Sheets

PARTIAL FREQUENCY OFFSET DIGITAL UPCONVERSION

FIELD OF THE INVENTION

The present invention pertains to a method of and an apparatus for upconverting a (complex) phase and amplitude modulated baseband signal to a signal at an intermediate frequency. More particularly, the present invention pertains to an apparatus for and a method of upconversion of a complex baseband signal having an in-phase component and a quadrature component, utilizing a single channel for the upconversion to the intermediate frequency instead of two separate channels. By implementing the present invention on a gate array, a great savings in configurable logic blocks (CLBs) is obtained.

BACKGROUND OF THE INVENTION

VHF data radio transmitters, for example as utilized in commercial airliners, requires conversion of a complex baseband signal to an intermediate frequency. Previous apparatus for and methods of achieving this have utilized two parallel channels to upconvert the in-phase and the quadrature components of the baseband signal. Each channel is sampled at, for example, 52.5 kilosamples per second (KSPS) and must be resampled at 50 megasamples per second (MSPS) before being mixed to an intermediate frequency of, for example, 21.4 MHz. Using existing apparatuses and methods, the output spectrum of such a signal is centered typically around 21.4 MHz, with an undesired component at 7.2 MHz. This undesired component can be removed by an intermediate frequency filter. However, to obtain high speed digital upconversion, use of configurable logic blocks, such as gates, is desirable, for example, field programmable gate array (FPGA) hardware. Existing techniques generally require a large number of logic blocks, generally more logic blocks than are available in present day FPGA chips. The two channels could be combined onto a single channel and reseparated after upsampling, with, for example, a Hilbert transform used to do this. However, it is difficult to implement this in hardware, and the size of the Hilbert transform filter operating at, for example, 50 MSPS would be prohibitive. In addition, there is an undesirable loss in fidelity.

SUMMARY OF THE INVENTION

The present invention is an apparatus for and a method of upconverting a (complex) phase and possible amplitude modulated baseband signal for radio transmission, also known in the industry as Quadrature Amplitude Modulation (QAM). The two components of the baseband signal consisting of an in-phase component I and a quadrature component Q, are to be upconverted to a desired real signal at a frequency $f_d$ hz, (normally called the IF or intermediate frequency signal). A subsequent conversion to a higher RF carrier frequency may occur after this process. This invention utilizes to a high degree a single channel for the upconversion process before the signal has been fully upconverted to the desired (IF) frequency $f_d$ in order to reduce the processing complexity in a digital upconverter. In accordance with the present invention, at least one of the two (complex) components is upconverted to a frequency $f_2$ hZ (which is small compared to the IF frequency $f_d$ and falls within the bandpass of the upconverter process) and is then added in a non-overlapping (in frequency) manner to the other component with the result that all modulation information is conveyed by a single (real) signal. The resulting real signal may consist of either 1) the sum of the baseband Q component added to the I component upconverted to $f_2$ or 2) the I and Q baseband information modulated on a very low carrier frequency of $f_2$ hZ such that the partially upconverted signal spectrum lies within the digital upconversion bandpass region. The second upconversion to the desired (IF) frequency $f_d$ is made on the partially upconverted real signal. Undesired sidebands are removed by an IF filter.

The appartus of the present invention can be implemented on a gate array, such as a field programmable gate array, which will result in a realization with a reduced number of configurable logic blocks (CLBs) compared to upsampling both I and Q to a high sample rate (50 Mhz for example) followed by modulation of the IF carrier. Thus this invention facilitates the implementation of a digital upconverter using logic gate arrays.

BRIEF DESCRIPTION OF THE DRAWINGS

These and other aspects and advantages of the present invention are more apparent from the following detailed description and claims, particularly when considered in conjunction with the accompanying drawings, in which like parts bear like reference numerals. In the drawings:

Each of FIGS. 2–5 depicts the frequency spectrum of the signal at a point in the apparatus of FIG. 1.

DETAILED DESCRIPTION OF PREFERRED EMBODIMENTS

Figure 1:
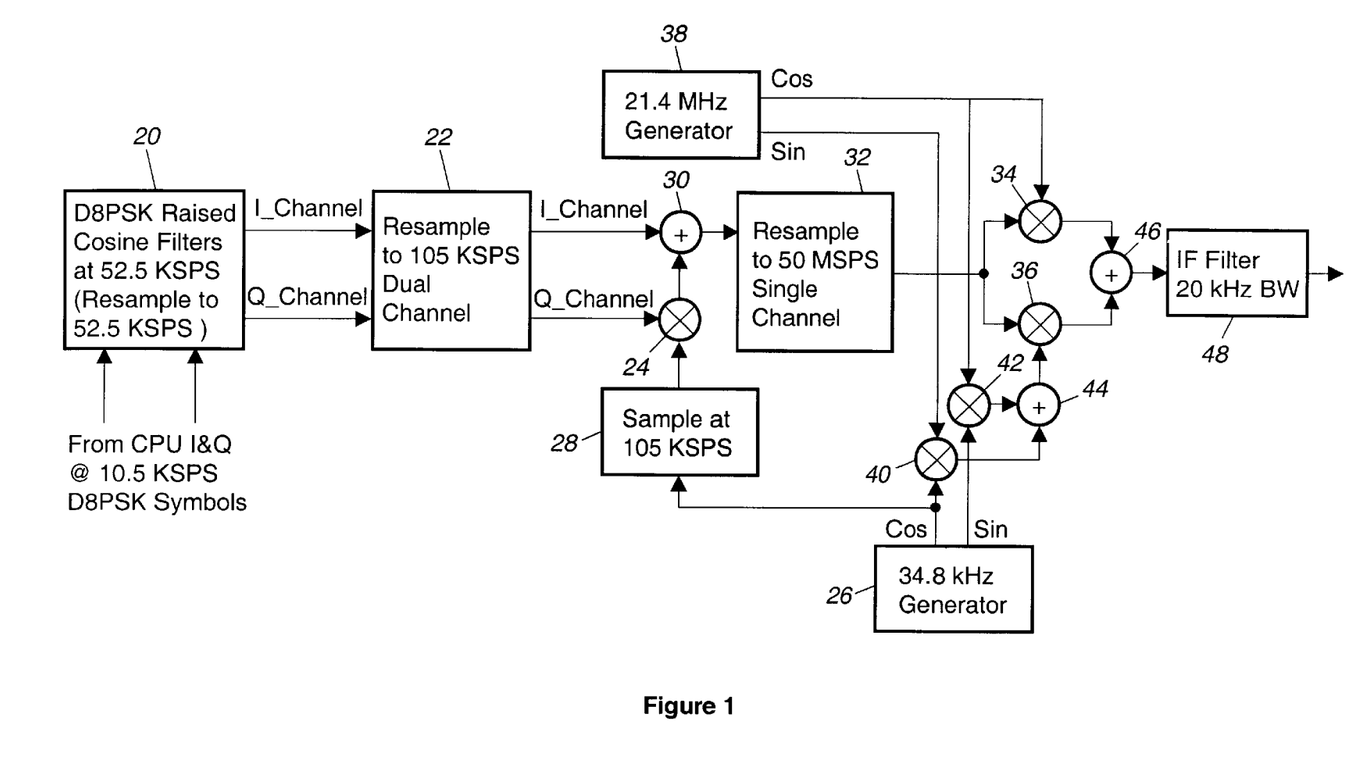
FIG. 1 is a block diagram of a first embodiment of an apparatus for upconverting a complex baseband signal in accordance with the present invention.

FIG. 1 is a block diagram of a first embodiment of an apparatus for upconverting a complex baseband signal in accordance with the present invention. The complex baseband signal, including an in-phase component I and a quadrature component Q, is applied from a source such as a central processing unit to a filter circuit 20 which, for example, might be a pair of differential eight phase shift keying (D8PSK) raised cosine filters, one filter for the in-phase component and one for the quadrature component. The CPU might provide the baseband signal sampled at, for example, 10.5 KSPS. Filters 20 resample the provided signal at a multiple of that rate, for example at 52.5 KSPS. The in-phase and quadrature outputs from filters 20 are applied to sampling circuit 22 which resamples them at a rate which is a multiple of the sampling frequency of filters 20, shown in FIG. 1 as twice that frequency or a sampling rate of 105 KSPS.

Figure 2:
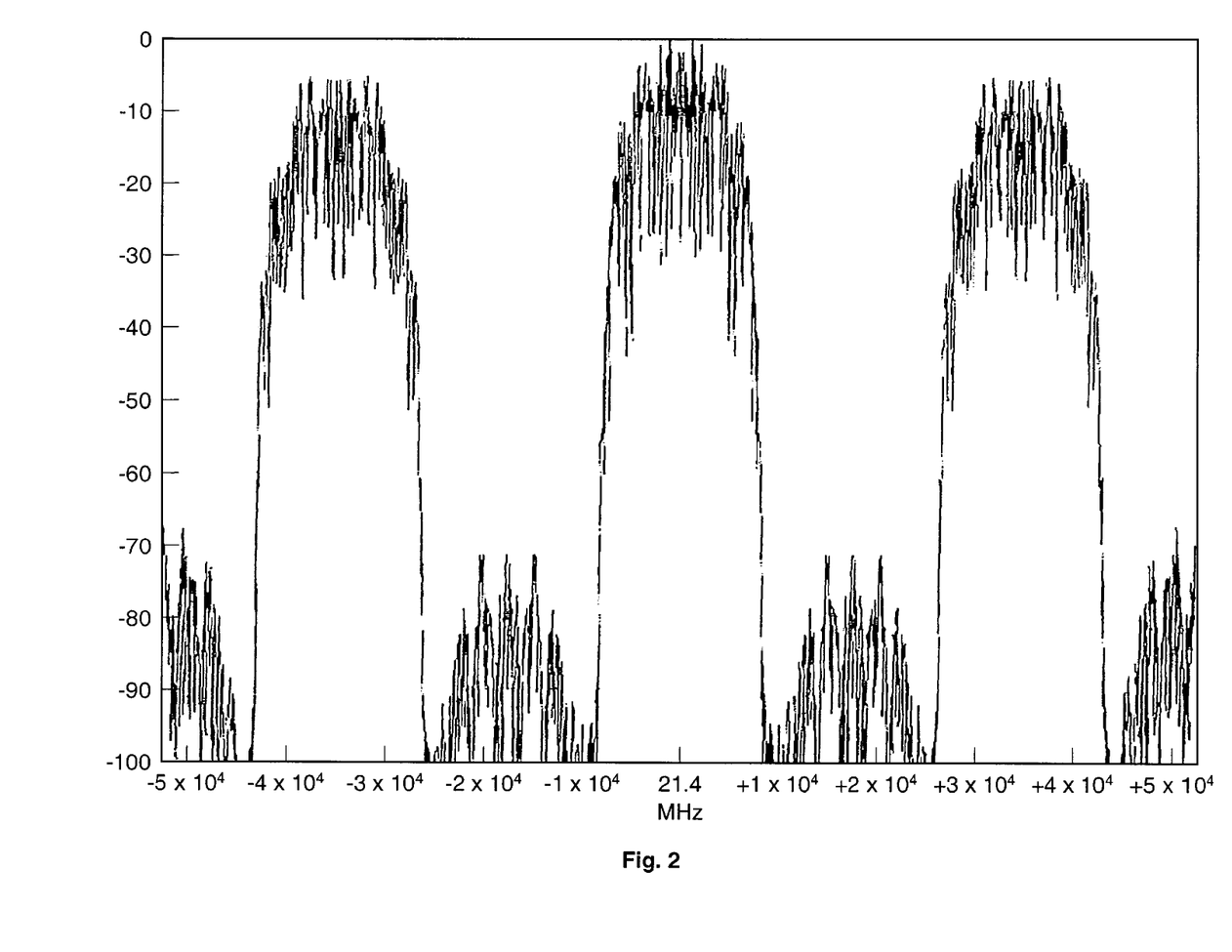
Figure 3:
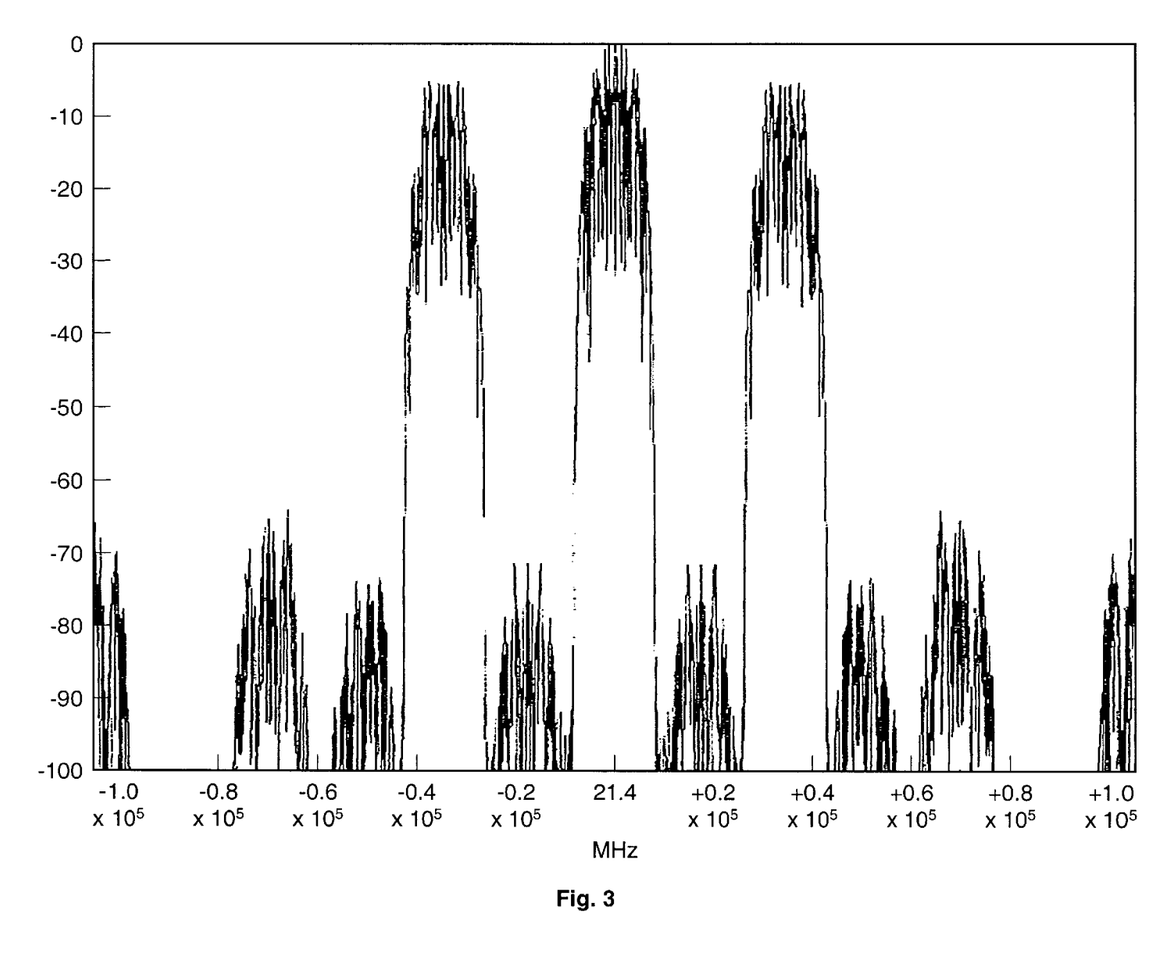

The quadrature output of sampling circuit 22 is applied to one input of multiplier 24. A sinesoidal signal generator 26 operating at, for example, 34.8 kHz provides a sine output and a cosine output. The cosine output is sampled by sampling circuit 28 at a sampling rate equal to the sampling rate of sampling circuit 22, shown in FIG. 1 as 105 KSPS. The sampled output from circuit 28 is applied to the second input of multiplier 24. The output of multiplier 24 is applied to one input of summation circuit 30 which receives the in-phase output from sampling unit 22 at its second input. The frequency spectrum of the output from summation circuit 30 is depicted in FIG. 2. This output is applied to sampling circuit 32 which resamples that signal at a high sampling rate, for example a sampling rate of 50 MSPS. FIG. 3 depicts the frequency spectrum of the output of sampling circuit 32.

The output of sampling circuit 32 is applied to one input of multiplier 34 and to one input of multiplier 36. A sinusoidal signal generator 38, operating at an intermediate frequency of, for example, 21.4 MHz, provides its sine output to one input of multiplier 40 and its cosine output to the second input of multiplier 34 and to one input of multiplier 42. The cosine output from signal generator 26 is applied to the second input of multiplier 40, while the sine output from generator 26 is applied to the second input of multiplier 42. The outputs of multipliers 40 and 42 are applied to the two inputs of summation circuit 44, the output of which is applied to the second input of multiplier 36.

Figure 4:
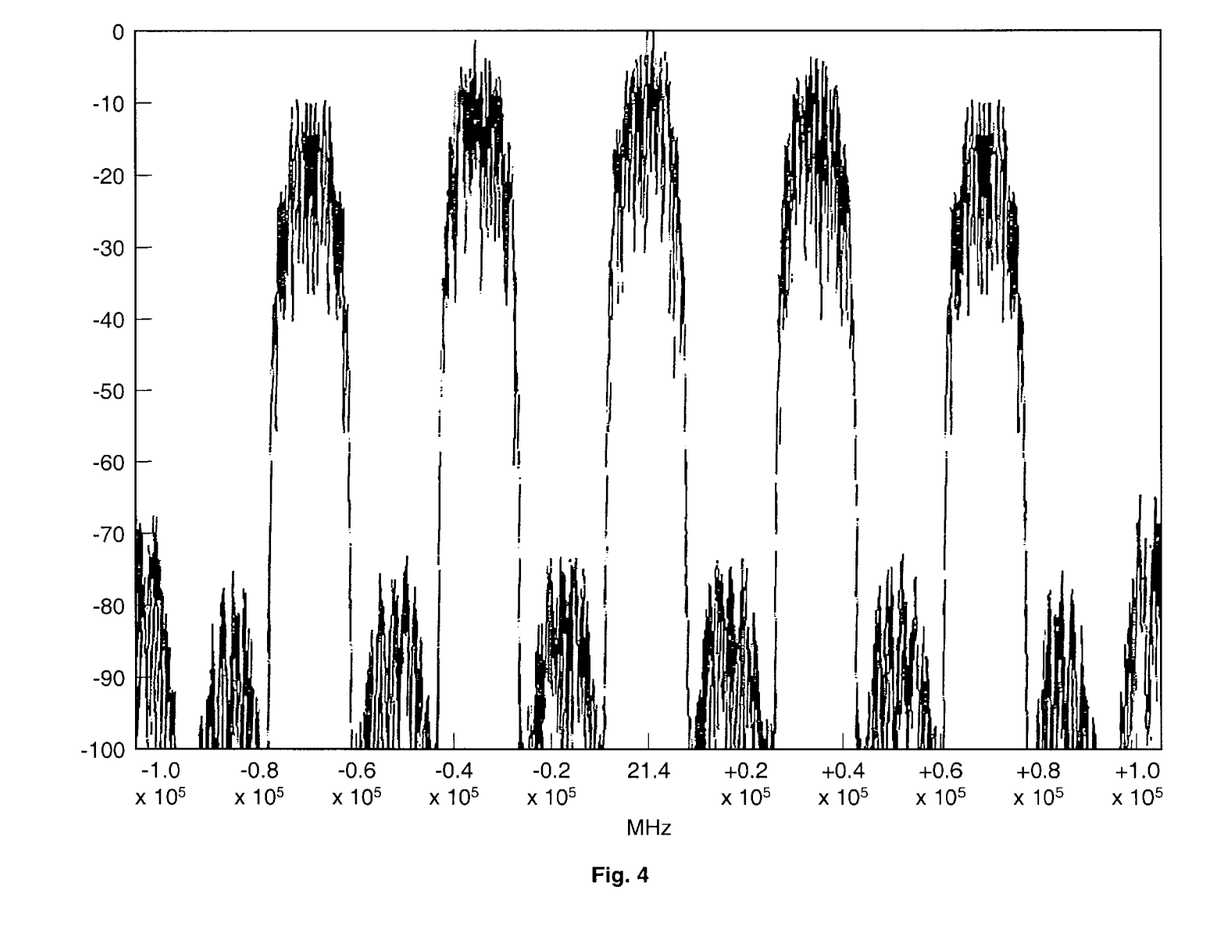
Figure 5:
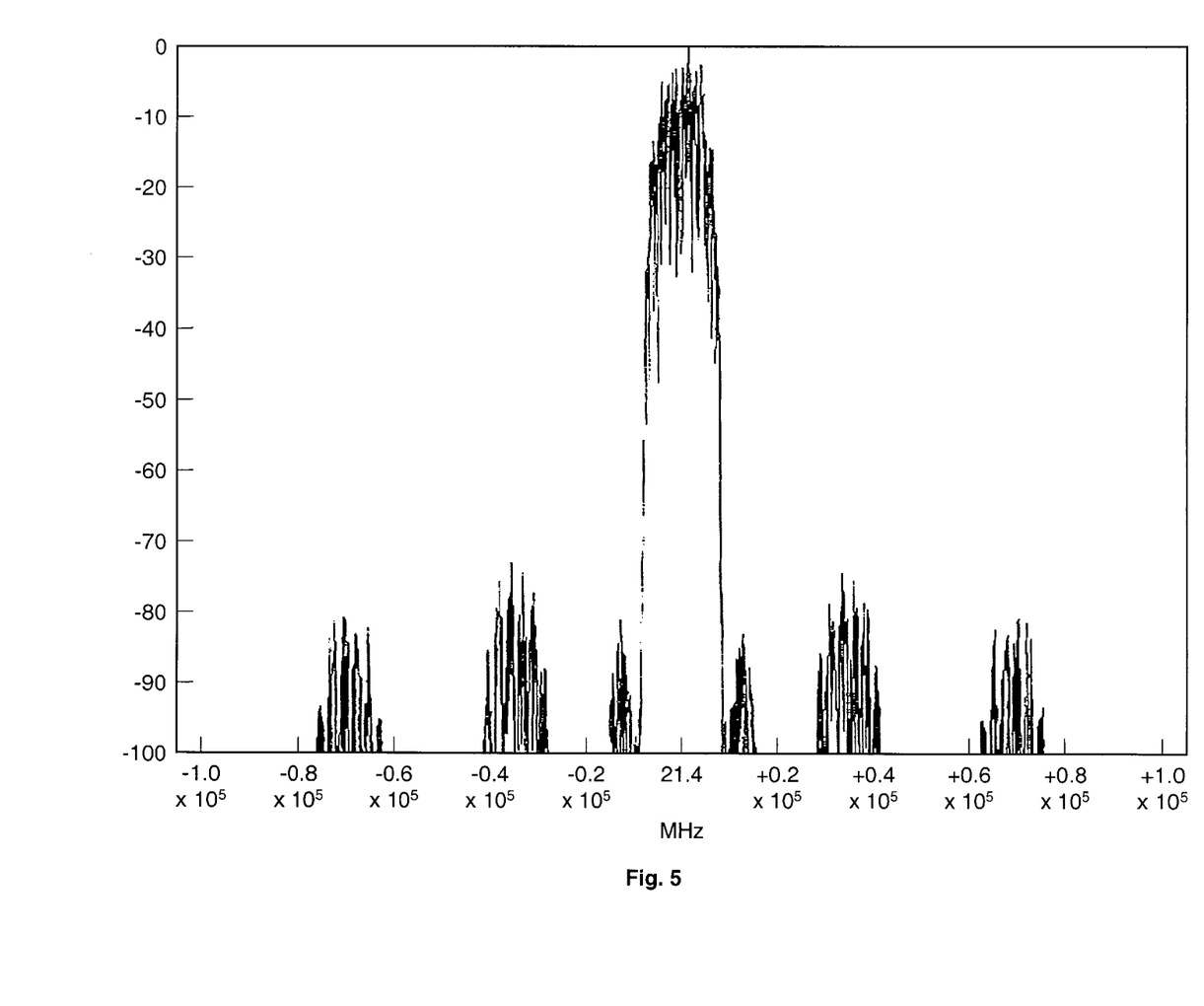

The outputs of multipliers 32 and 34 are applied to the two inputs of summation circuit 46, the output of which is the baseband signal which has been upconverted to 21.4 MHz, plus a sideband at 17.5 kHz. The frequency spectrum of the output of summation circuit 46 is depicted in FIG. 4. This signal is applied to intermediate frequency filter 48 which removes the sideband, providing the baseband signal at 21.4 MHz. FIG. 5 depicts the frequency spectrum of this output signal.

Preferably, the circuitry of FIG. 1 is implemented in a gate array, such as a field programmable gate array (FPGA). In such event, a first look-up table can provide the sampled 34.8 kHz cosine output of sampling circuit 28, second and third look-up tables can provide the 34.8 kHz sine and the 34.8 kHz cosine signals to multipliers 42 and 44, and fourth and fifth lookup tables can provide the 21.4 MHz sine and 21.4 MHz cosine outputs of signal generator 38. Such implementation permits high speed operation.

Figure 6:
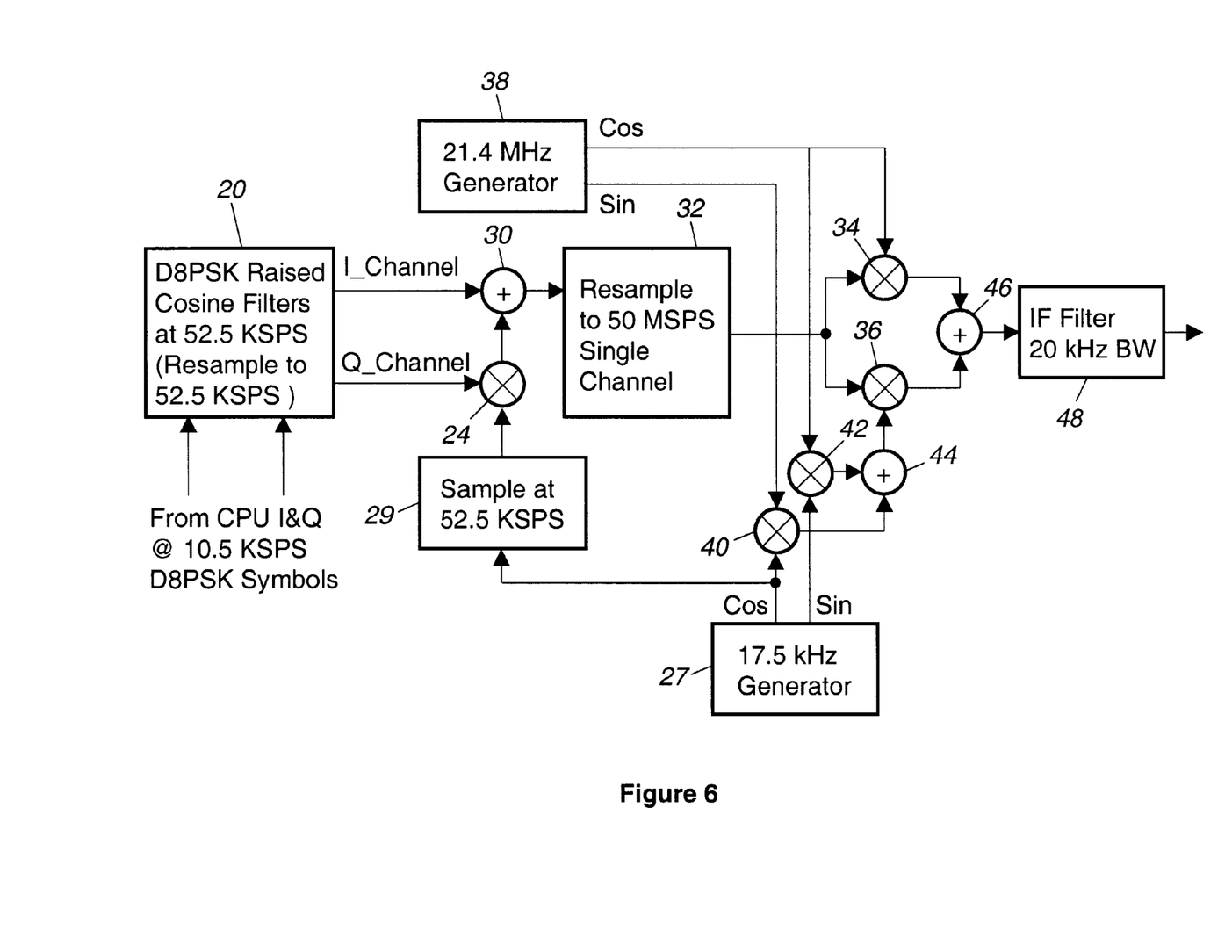
FIG. 6 is a block diagram of a second embodiment of an apparatus for upconverting a complex baseband signal in accordance with the present invention.

FIG. 6 depicts a second embodiment of an apparatus for upconverting a complex baseband signal to an intermediate frequency in accordance with the present invention. The embodiment of FIG. 6 differs from that of FIG. 1 primarily by omitting sampling circuit 22. Instead, filters 20 apply the quadrature component to one input of multiplier 24 and the in-phase signal to one input of summation circuit 30. A sinusoidal signal generator 27 operating at, for example, 17.5 kHz, provides a sine output and a cosine output. The cosine output is sampled by sampling circuit 29 at a sampling rate equal to the frequency of filters 20, shown in FIG. 6 as 52.5 KSPS. The sampled output from circuit 29 is applied to the second input of multiplier 24, the output of which is applied to the second input of summation circuit 30. The resulting single channel baseband signal is sampled by sampling circuit 32 at, for example, 50 MSPS, as in the embodiment of FIG. 1. In the embodiment of FIG. 6, the 21.4 MHz sine output from intermediate frequency signal generator 38 is applied to one input of multiplier 40, while the 21.4 MHz cosine output is applied to one input of multiplier 42. The sine output from generator 27 is applied to the second input of multiplier 42, while the cosine output from generator 27 is applied to the second input of multiplier 40. The outputs of multipliers 40 and 42 are combined by summation circuit 44. The 21.4 MHz cosine output from intermediate frequency signal generator 38 and the output of sampling circuit 32 are applied to the two inputs of multiplier 34. The output from sampling circuit 32 and the output of summation circuit 44 are applied to the two inputs of multiplier 36. The outputs of multipliers 34 and 36 are combined in summation circuit 46 which therefore provides the baseband signal upconverted to 21.4 MHz with a sideband at 17.5 kHz. This signal is applied to intermediate frequency filter 48 which removes the sideband, providing the baseband signal upconverted to the 21.4 MHz intermediate frequency as its output. Again, signal generators 27 and 38 and sampling circuit 29 can be look-up tables, and the circuitry can be implemented on a gate array, such as a FPGA.

Figure 7:
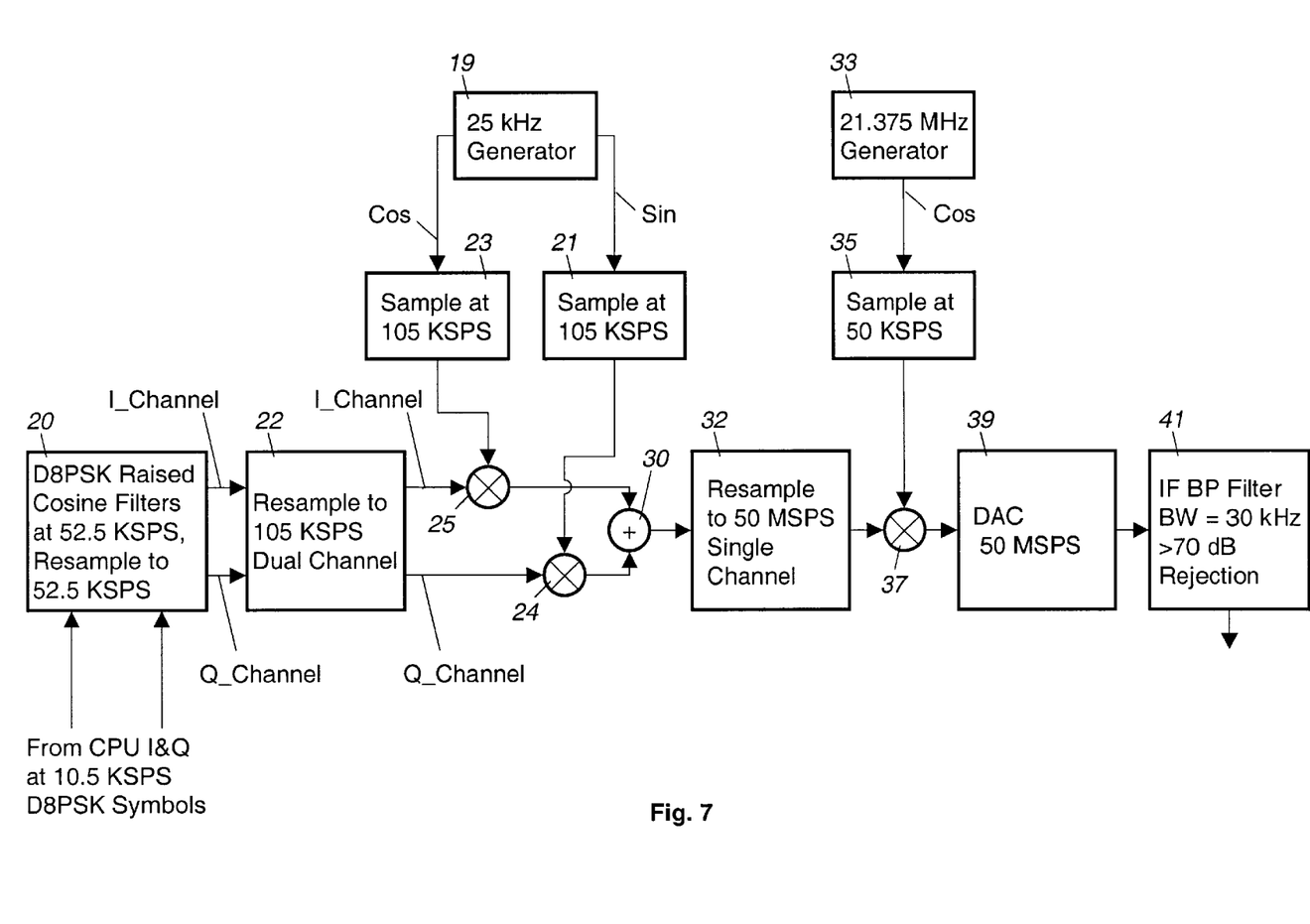
FIG. 7 is a block diagram of a third embodiment of an apparatus for upconverting a complex baseband signal in accordance with the present invention; and Each of FIGS. 8–12 depicts the frequency spectrum of the signal at a point in the apparatus of FIG. 7.
Figure 8:
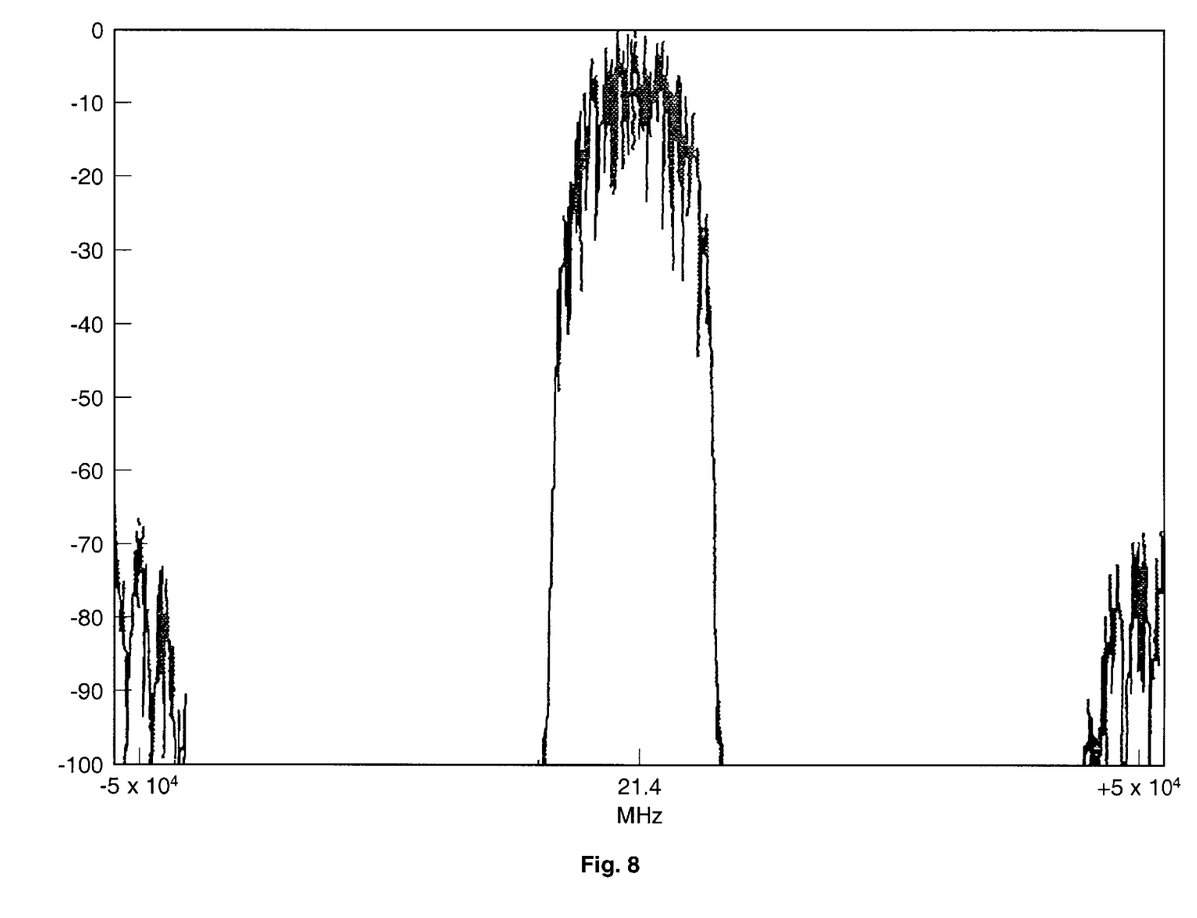
Figure 9:
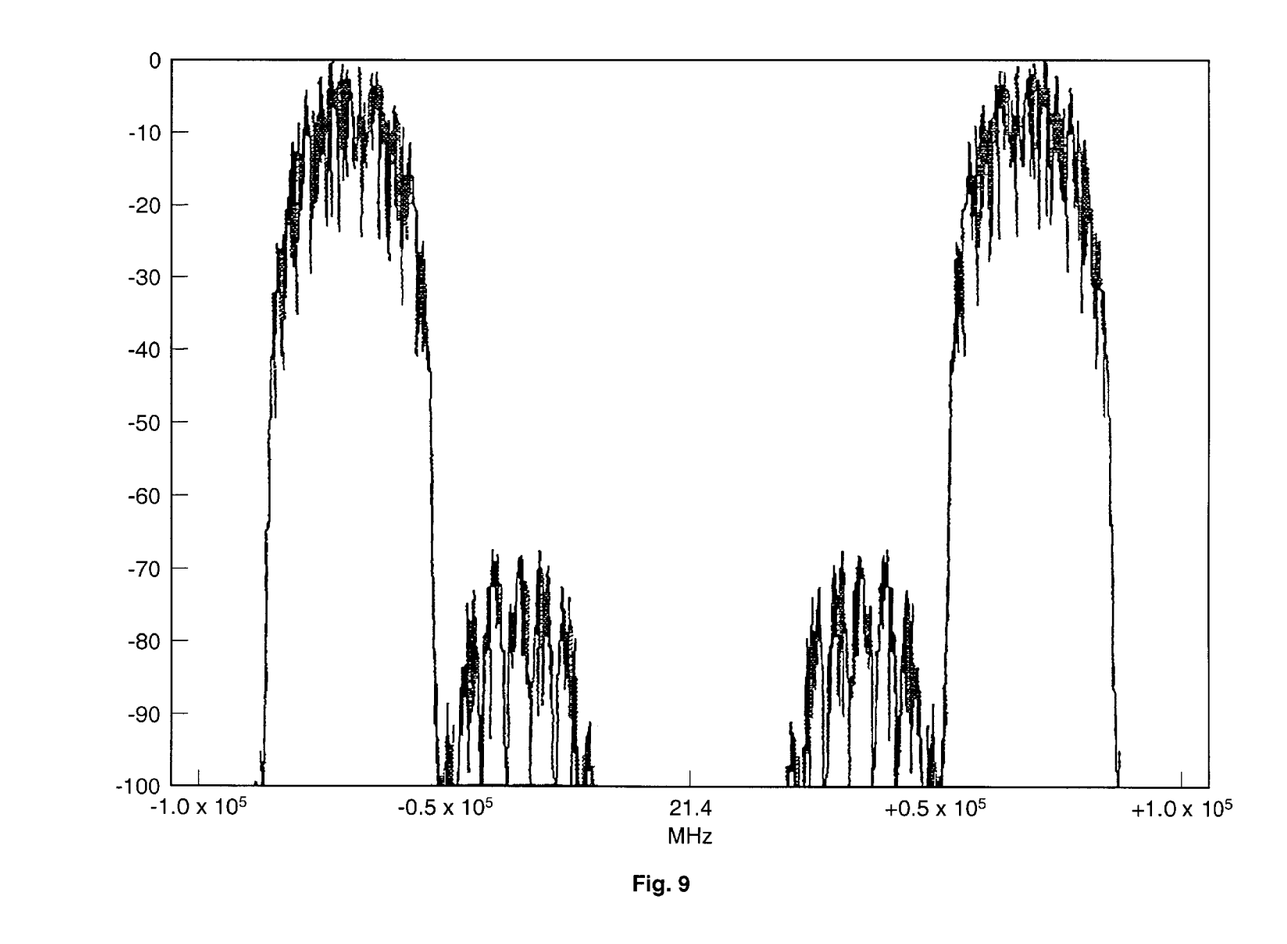
Figure 10:
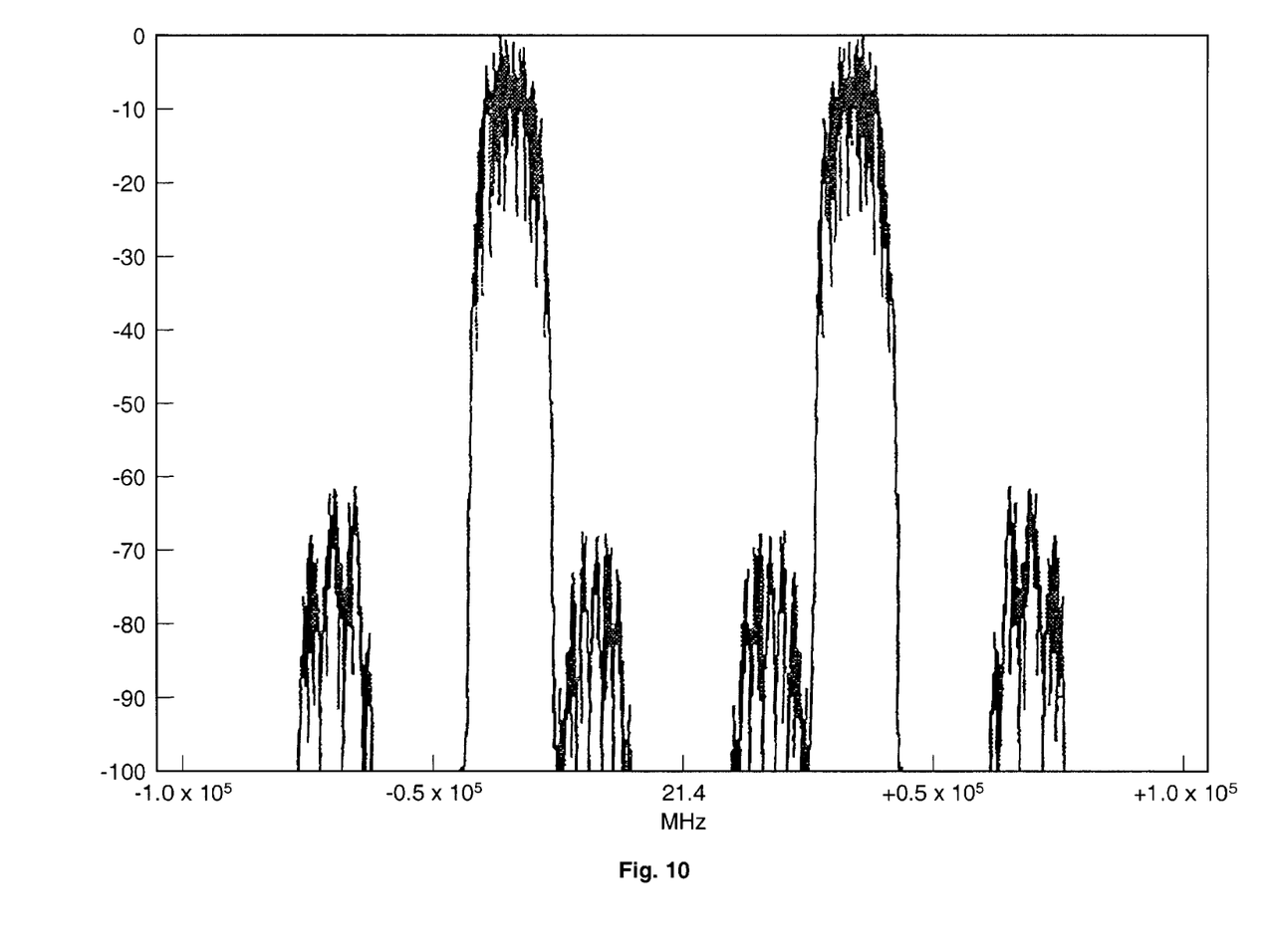
Figure 11:
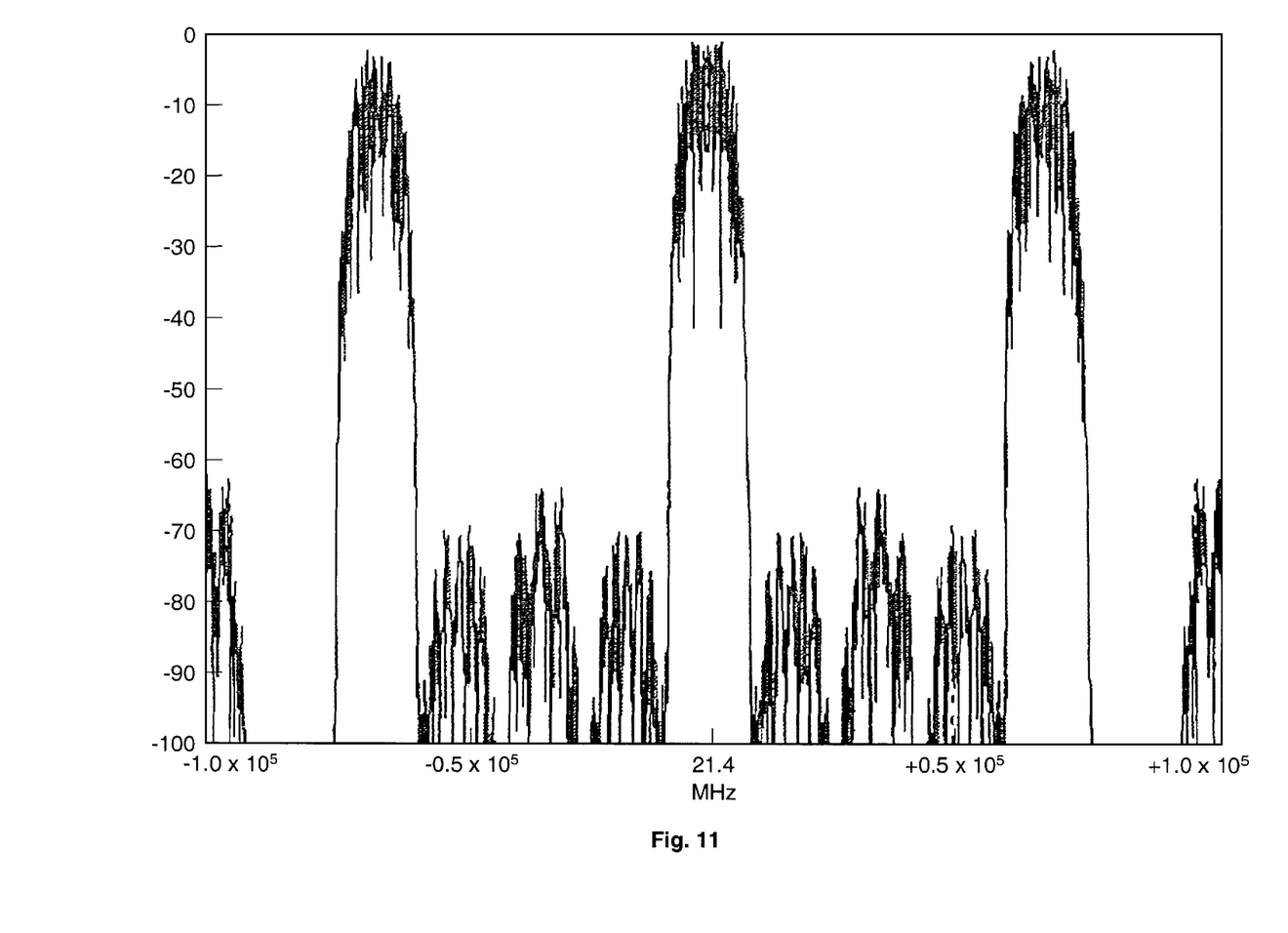
Figure 12:
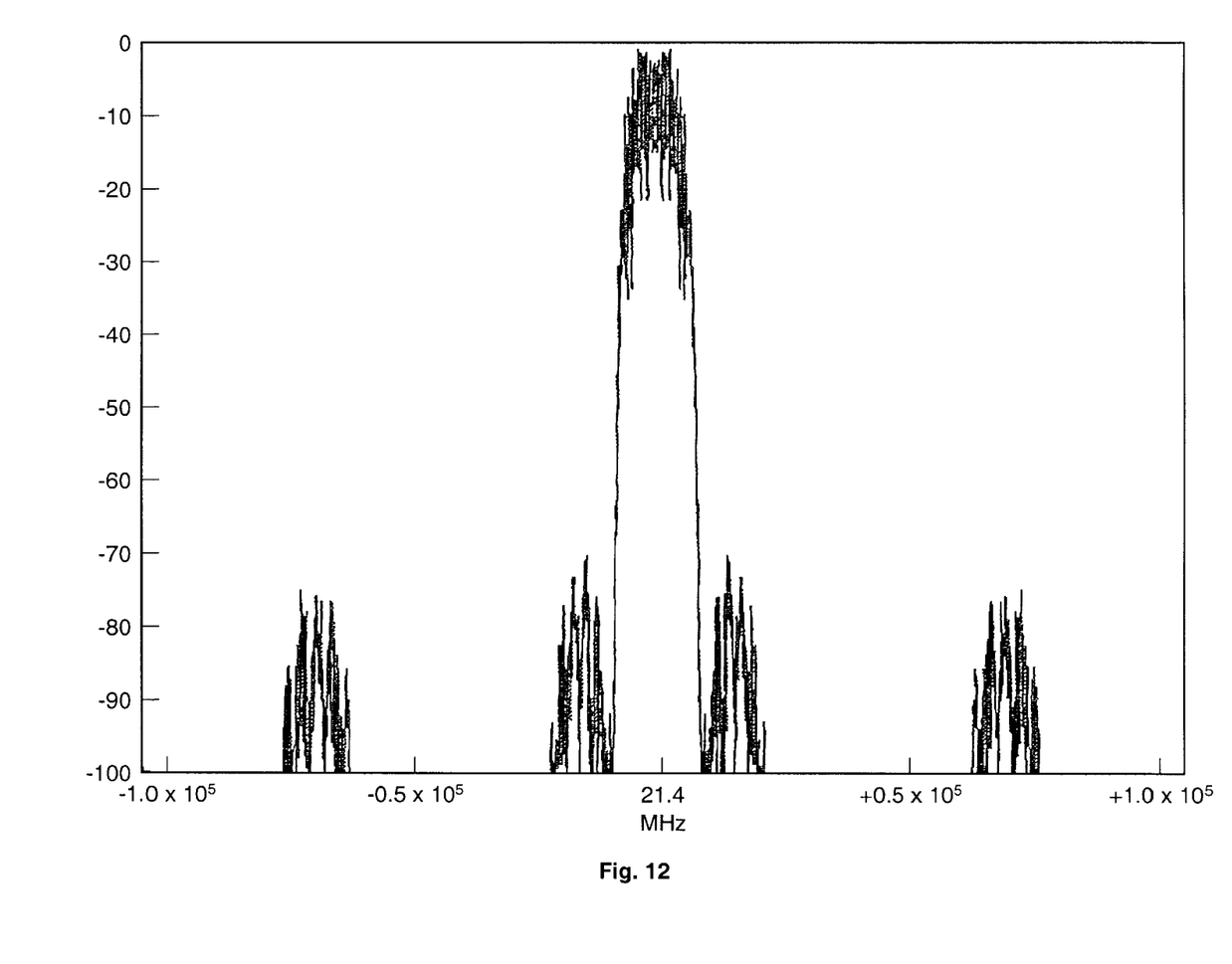

FIG. 7 depicts a third embodiment of an apparatus for upconverting a complex baseband signal in accordance with the present invention. As in the embodiments of FIGS. 1 and 6, the in-phase and quadrature signals, sampled at, for example, 10.5 KSPS are applied to filters 20, which might be D8PSK raised cosine filters which resample at 52.5 KSPS and filter. Filters 20 provide the in-phase component and the quadrature component of the baseband signal to sampling circuit 22 which resamples them at a multiple of the sampling rate of filters 20, depicted in FIG. 7 as 105 KSPS. The frequency spectrum of the in-phase and quadrature component outputs from filters 20 as depicted in FIG. 8. The quadrature component of the signal is applied by sampling circuit 22 to one input of multiplier 24. The in-phase component is applied to one input of multiplier 25. A sinusoidal signal generator 19 operating at, for example, 25 kHz, provides a sine output to sampling circuit 21 and a cosine output to sampling circuit 23. Sampling circuits 21 and 23 sample at a sampling rate equal to that of sampling circuit 22, shown in FIG. 7 as 105 KSPS. The output of sampling circuit 21 is applied to the second input of multiplier 24, while the output of sampling circuit 23 is applied to the second input of multiplier 25. The outputs of multipliers 24 and 25 are applied to the two inputs of summation circuit 30, the output of which is applied to sampler 32. The frequency spectrum of this output from summation circuit 30 is depicted in FIG. 9. Sampler 32 resamples this combined signal at, for example, 50 MSPS and applies the resulting sampled signal to one input of multiplier 37. The frequency spectrum of this sampled signal is depicted in FIG. 10. A sinusoidal signal generator 33 operating at, for example, 21.375 MHz, provides a cosine output that is sampled by sampling circuit 35 at the same sampling rate as sampling circuit 32, shown in FIG. 7 as 50 MSPS. This sampled output is applied to the second input of multiplier 37. The resulting signals of 21.400 MHz and 21.350 MHz, each sampled at 50 MSPS, are applied to digital-to-analog converter 39 which samples at that same 50 MSPS rate, providing analog 21.4 MHz and 21.350 MHz signals. The frequency spectrum of the output from digital-to-analog converter 39 is depicted in FIG. 11. The output of digital-to-analog converter 39 is applied to intermediate frequency bandpass filter 41 which removes the 21.350 MHz signal to provide the intermediate frequency output of 21.4 MHz. The frequency spectrum of this signal is depicted in FIG. 12.

As in the embodiments of FIGS. 1 and 6, the sampled 25 kHz sine signal from sampler 21, the 25 kHz cosine signal from sampler 23, and the sampled 21.375 MHz signal from sampler 35 can be provided by look-up tables, and the circuitry of FIG. 7 can be implemented in a gate array, such as a FPGA. Various frequencies could be utilized in the upconversion. Preferably, frequencies are selected that minimize the size of the gate arrays utilized for the look-up tables. By way of example, each look-up table to provide the sine 25 kHz sampled at 105 KSPS and the cosine 25 kHz sampled at 105 KSPS requires only 21 entries, while the look-up table required to provide to cosine 21.375 MHz sampled at 50 MSPS requires only 400 entries. Thus, these can readily be implement on gate arrays.

Although the present invention has been described with reference to preferred embodiments, various alternations, rearrangements, and substitutions could be made, and still the result would be within the scope of the invention.

What is claimed is:

1. A method of upconverting a complex baseband signal, of a frequency $f_i$ and having an in-phase component and a quadrature component, to a desired frequency $f_d$, said method comprising the steps of:
   (a) upconverting at least one of the components of the complex baseband signal to a frequency $f_2$;
   (b) combining the components of the complex baseband signal as existing after step (a) to provide a single channel signal;
   (c) up converting the single channel signal to the frequency $f_d$, with at least one sideband at a sideband frequency $f_2$; and
   (d) filtering the upconverted single channel signal to remove the at least one sideband.

2. A method as claimed in claim 1, wherein upconverting at least one of the complex baseband signals comprises upconverting only one of the components of the complex baseband signal.

3. A method as claimed in claim 2, wherein combining the components comprises summing the components of the baseband signal as existing after step upconverting the components.

4. A method as claimed in claim 2, wherein upconverting the single channel signal comprises multiplying the summed components with a first signal having a frequency of $f_d$ to provide a first multiplied signal; multiplying the summed component with a second signal having a frequency $f_d$ and a sideband at the frequency $f_2$ to provide a second multiplied signal; and summing the first multiplied signal and the second multiplied signal.

5. A method as claimed in claim 1, wherein upconverting at least one of the complex baseband signlas comprises upconverting both components of the complex baseband signal.

6. A method as claimed in claim 5, wherein combining the components comprises summing the components of the baseband signal as existing after upconverting the components.

7. A method as claimed in claim 5, wherein upconverting the single channel signal comprises multiplying the single channel baseband signal with a signal having a frequency of $(f_d-f_2)$; converting the multiplied signal to an analog signal; and filtering the analog signal to leave the signal at frequency $f_d$.

8. A method as claimed in claim 1, wherein $f_2=nf_i$, where n is an integer greater than 1.

9. A method of upconverting a complex baseband signal, having an in-phase component and a quadrature component, to a desired frequency $f_d$, said method comprising the steps of:
   (a) providing a complex baseband signal having an in-phase component and a quadrature component and sampled at a sampling rate $f_i$;
   (b) resampling the sampled complex baseband signal at a sampling rate $f_2$;
   (c) upconverting at least one of the sampled components of the complex baseband signal to a frequency $f_3$;
   (d) combining the components of the complex baseband signal as existing after step (d) to provide a single channel signal;
   (e) upconverting the single channel signal to the frequency $f_d$, with at least one sideband at a sideband frequency $f_3$; and
   (f) filtering the upconverted single channel signal to remove the at least one sideband.

10. A method as claimed in claim 9, wherein upconverting at least one of the sampled components comprises upconverting only one of the components of the complex baseband.

11. A method as claimed in claim 9, wherein combining the components comprises summing the components of the baseband signal as existing after upconverting the components.

12. A method as claimed in claim 10, wherein upconverting the single channel signal comprises multiplying the summed components with a first signal having a frequency of $f_d$ to provide a first multiplied signal; multiplying the summed components with a second signal having a frequency $f_d$ and a sideband at the frequency $f_2$ to provide a second multiplied signal; and summing the first multiplied signal and the second multiplied signal.

13. A method as claimed in claim 9, wherein upconverting at least one of the sample components comprises upconverting both components of the complex baseband signal.

14. A method as claimed in claim 13, wherein combining the components comprises summing the components of the baseband signal as existing after upconverting the components.

15. A method as claimed in claim 13, wherein upconverting the single channel signal comprises multiplying the single channel baseband signal with a signal having a frequency of $(f_d-f_2)$; converting the multiplied signal to an analog signal; and filtering the analog signal to leave the signal at frequency $f_d$.

16. A method as claimed in claim 9, wherein $f_2=nf_i$, where n is an integer greater than 1.

17. Apparatus for upconverting a complex baseband signal, of a frequency $f_i$ and having an in-phase component and a quadrature component, to a desired frequency $f_d$, said apparatus comprising:
   a first multiplication circuit for upconverting at least one of the components of the complex baseband signal to a frequency $f_2$;
   a combining circuit for combining the components of the complex baseband signal as existing after upconverting by said first multiplication circuit, to provide a single channel signal;
   a second multiplication circuit for upconverting the single channel signal to the frequency $f_d$, with at least one sideband at a sideband frequency $f_2$; and
   a filter circuit for filtering the upconverted single channel signal to remove the at least one sideband.

18. An apparatus as claimed in claim 17, wherein said first multiplication circuit upconverts only one of the components of the complex baseband signal.

19. An apparatus as claimed in claim 17, wherein said combining circuit comprises a summation circuit for summing the components of the baseband signal as existing after upconverting by said first multiplication circuit.

20. An apparatus as claimed in claim 17, wherein said second multiplication circuit comprises a first multiplier for multiplying the combined components with a first signal having a frequency of $f_d$, to provide a first multiplied signal; a second multiplier for multiplying the combined components with a second signal having a frequency $f_d$ and a sideband at the frequency $f_2$ to provide a second multiplied signal; and a summation circuit for summing the first multiplied signal and the second multiplied signal.

21. An apparatus as claimed in claim 17, wherein said first multiplication circuit upconverts both components of the complex baseband signal.

22. An apparatus as claimed in claim 17, wherein said first multiplication circuit comprises a first multiplier for multiplying the single channel baseband signal with a signal having a frequency of $(f_d - f_2)$; an analog-to-digital converter for converting the multiplied signal to an analog signal; and a filter circuit for filtering the analog signal to leave the signal at frequency $f_d$.

23. An apparatus as claimed in claim 17, wherein $f_2 = nf_1$, where n is an integer greater than 1.

24. An apparatus for upconverting a complex baseband signal, having an in-phase component and a quadrature component, to a desired frequency $f_d$, said apparatus comprising:
   a source of a complex baseband signal having an in-phase component and a quadrature component and sampled at a sampling rate $f_i$;
   a first sampling circuit for resampling the sampled complex baseband signal at a sampling rate $f_2$;
   a first multiplication circuit for upconverting at least one of the components of the complex baseband signal to a frequency $f_3$;
   a combining circuit for combining the components of the complex baseband signal as existing after upconverting by said first multiplication circuit, to provide a single channel signal;
   a second multiplication circuit for upconverting the single channel signal to the frequency $f_d$, with at least one sideband at a sideband frequency $f_3$; and
   a filter circuit for filtering the upconverted single channel signal to remove the at least one sideband.

25. An apparatus as claimed in claim 24, wherein said first multiplication circuit upconverts only one of the components of the complex baseband signal.

26. An apparatus as claimed in claim 24, wherein said combining circuit comprises a summation circuit for summing the components of the baseband signal as existing after upconverting by said first multiplication circuit.

27. An apparatus as claimed in claim 24, wherein said second multiplication circuit comprises a first multiplier for multiplying the summed components with a first signal having a frequency of $f_d$ to provide a first multiplied signal; a second multiplier for multiplying the summed components with a second signal having a frequency $f_d$ and a sideband at the frequency $f_2$ to provide a second multiplied signal; and a summation circuit for summing the first multiplied signal and the second multiplied signal.

28. An apparatus as claimed in claim 24, wherein said first multiplication circuit upconverts both components of the complex baseband signal.

29. An apparatus as claimed in claim 24, wherein $f_2 = nf_1$, where n is an integer greater than 1.

* * * * *